United States Patent [19]

Kamo et al.

[11] Patent Number: 4,636,610
[45] Date of Patent: Jan. 13, 1987

[54] FEED LENGTH CONTROL DEVICE FOR CONSUMABLE ELECTRODE WELDING OPERATIONS

[75] Inventors: Kazuhiko Kamo, Hyogo; Hiroshi Suwahara; Ryuji Nakane, both of Aichi, all of Japan

[73] Assignees: Mitsubishi Denki Kabushiki Kaisha; Mitsubishi Jukogyo Kabushiki Kaisha, both of Tokyo, Japan

[21] Appl. No.: 789,257

[22] Filed: Oct. 18, 1985

[30] Foreign Application Priority Data

Oct. 18, 1984 [JP] Japan ................................ 59-219249

[51] Int. Cl.4 ............................................. B23K 9/12
[52] U.S. Cl. ........................... 219/124.02; 219/130.51; 219/136
[58] Field of Search .................... 219/130.51, 124.02, 219/124.03, 136, 137.71, 137.2

[56] References Cited

U.S. PATENT DOCUMENTS 4,525,619  6/1985  Ide et al. ........................... 219/137.2

FOREIGN PATENT DOCUMENTS 1368492  9/1962  France ............................ 219/124.02
57-62865  4/1982  Japan ............................. 219/130.51

Primary Examiner—Clifford C. Shaw
Attorney, Agent, or Firm—Sughrue, Mion, Zinn, Macpeak and Seas

[57] ABSTRACT

A feed length control device for a consumable electrode type welding machine in which the feed length of the electrode is made constant, making the resulting welds satisfactory and with a deep weld penetration. In accordance with the invention, the start of feed length control is delayed for a predetermined period of time from the time instant when the welding current value changes from the peak set value to the base set value.

4 Claims, 6 Drawing Figures

FEED LENGTH CONTROL DEVICE FOR CONSUMABLE ELECTRODE WELDING OPERATIONS

BACKGROUND OF THE INVENTION

The present invention relates to a feed length control device for use in consumable electrode welding operations in which a pulse-like welding current is employed.

FIG. 1 is a block diagram showing a conventional feed length control device used in consumable electrode welding operations.

In FIG. 1, reference numeral 1 designates a welding machine; 2, a torch for holding a wire electrode; and 4, a wire electrode feeding motor which rotates a pair of drive rollers 5 to feed the wire electrode 3. Further in FIG. 1, reference numeral 6 designates a torch moving mechanism for moving the torch 2 vertically; 7, a torch moving motor for operating the torch moving mechanism 6; 8, a metal base; 9, a current detector for detecting the welding current flowing between the wire electrode 3 and the metal base 8 supplied by the welding machine 1 and outputting a welding current detection signal generator; 10, a reference signal having a state determined according to the wire electrode feed length set in the welding operation; and 11, a comparator which compares the welding current detection signal outputted by the current detector 9 with the reference signal 10 to provide a deviation signal. Further in FIG. 1, reference numeral 12 designates a welding current setting unit for setting the peak current value, base current value, peak current time and base current time of a welding current; 13, a feed length control start instruction circuit which, in response to the deviation signal from the comparator and an output signal of the welding current setting unit 12 establishes the feed control timing; and 14, a motor drive circuit for amplifying the output signal of the circuit 13 to drive the torch moving motor 7.

In the feed length control device thus constructed, while the wire electrode 3 is being fed by the wire electrode feeding motor 4, a welding current is caused to flow between the wire electrode 3 and the base 8 so that arcing occurs between the wire electrode 3 and the base 8 to achieve the welding operation. As shown in FIG. 2, feed length control is carried out while the welding currrent is in the base current period. While the welding current is in the peak current period, feed length control is not carried out, but the welding current is varied to control the weld penetration or the amount of deposition.

In this case, the welding current set value is changed from a peak current set value to a base current set value instantaneously as shown in FIG. 2. However, the actual welding current set value cannot change from a peak current value to a base current value instantaneously. It has been found through measurement that it takes about 0.3 second for the welding current to change as described above. However, since feed length control starts at the time instant when the welding current set value is changed from the peak current set value to the base current set value as shown in FIG. 2, in practice, feed length control is started before the welding current changes from the peak current value to the base current value. Further, the reference signal from generator 10 for feed length control is made to coincide with the base current value. Therefore, disadvantageously the feed length is extremely long when feed length control starts.

SUMMARY OF THE INVENTION

An object of the invention is to eliminate the above-described difficulties accompanying a conventional feed length control device used in a consumable electrode welding operation.

The above and other objects are met by the provision of a feed length control device for use in consumable electrode welding operations in which the start of feed length control is delayed for a predetermined period of time from the time instant when the welding current set value changes from the peak current set value to the base current set value; that is, feed length control is started when the actual welding current reaches the base current value. Accordingly, the feed length will not be extremely long when feed length control is started.

A feed length control device used in consumable electrode welding operations according to the invention comprises a delay circuit which delays the start of electrode wire feed length control for a predetermined period of time from the start of the base current set period.

In accordance with the invention, feed length control is carried out when the actual welding current reaches the base current value. Therefore, the feed length will not be excessively long at the start of feed length control, and the resultant weld will be satisfactory, having a deep weld penetration.

DESCRIPTION OF THE PREFERRED EMBODIMENTS

A preferred embodiment of the invention will be described with reference first to FIGS. 3 and 4.

Figure 3:
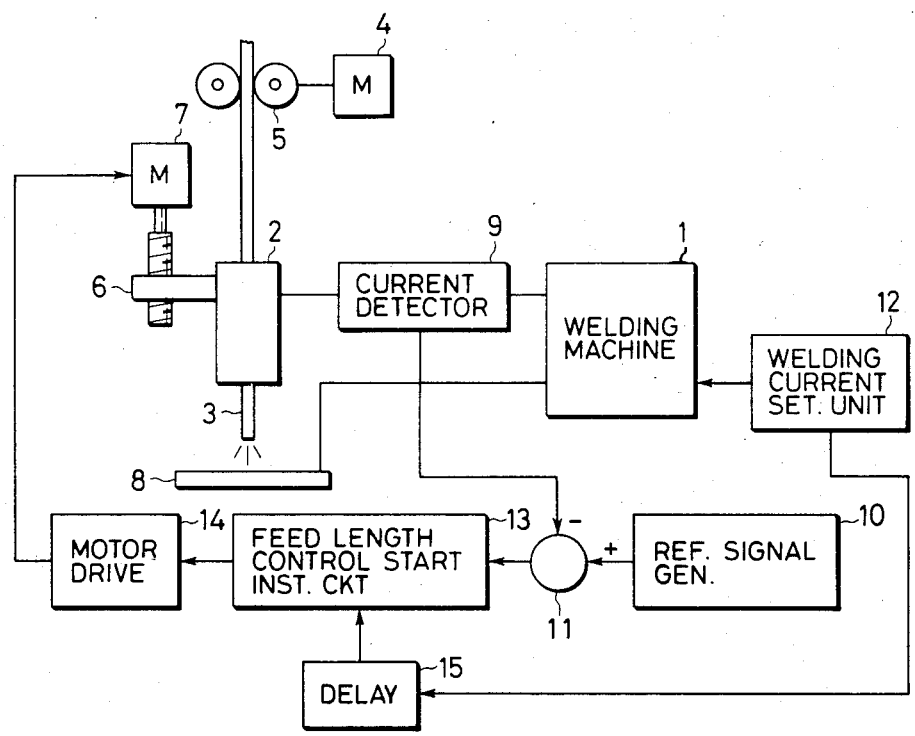
FIG. 3 is a block diagram showing a preferred embodiment of a feed length control device of the invention.

FIG. 3 is a block diagram showing a welding machine constructed according to the invention. In FIG. 3, reference numerals 1 through 14 designate the same components as those in the above-described conventional device, and reference numeral 15 designates a delay circuit for delaying the start time of the feed length control signal.

Figure 4:
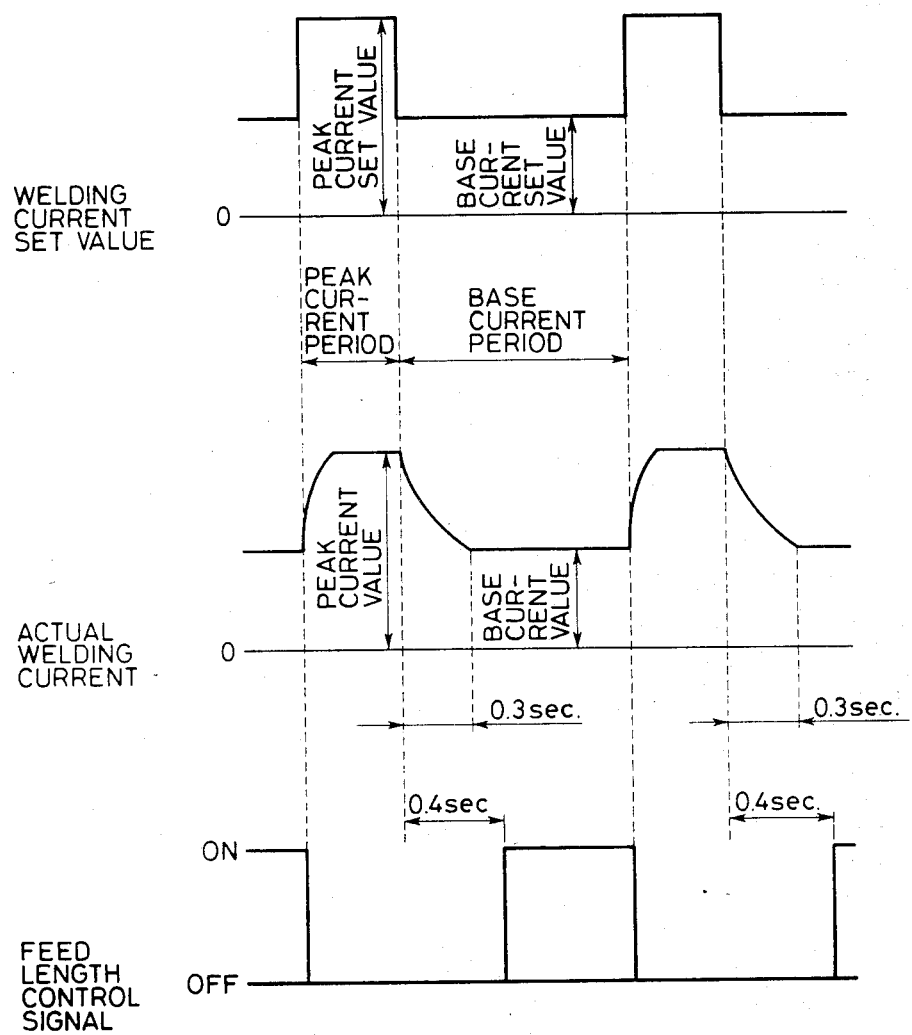
FIG. 4 is a timing chart used for a description of the operation of the preferred embodiment.

In the feed length control device thus constructed, as shown in FIG. 4, the start of feed length control is delayed by the delay circuit 15 for a predetermined period of time, for instance, about 0.4 second, from the time instant when the welding current set value is changed from the peak current set value to the base current set value; that is, feed length control is started when the actual welding current reaches the base current value. Therefore, the feed length will not be excessively long, and it is substantially constant at all times.

In the above-described embodiment, the delay circuit 15 is added to the conventional device. However, instead of the employment of the delay circuit 15, a method of changing the reference signal from generator 10 according to the actual welding current waveform may be employed, or a reverse bias voltage in the base current period of the welding current detection signal may be applied to make the welding current detecting signal constant for the base current period.

Figure 5:
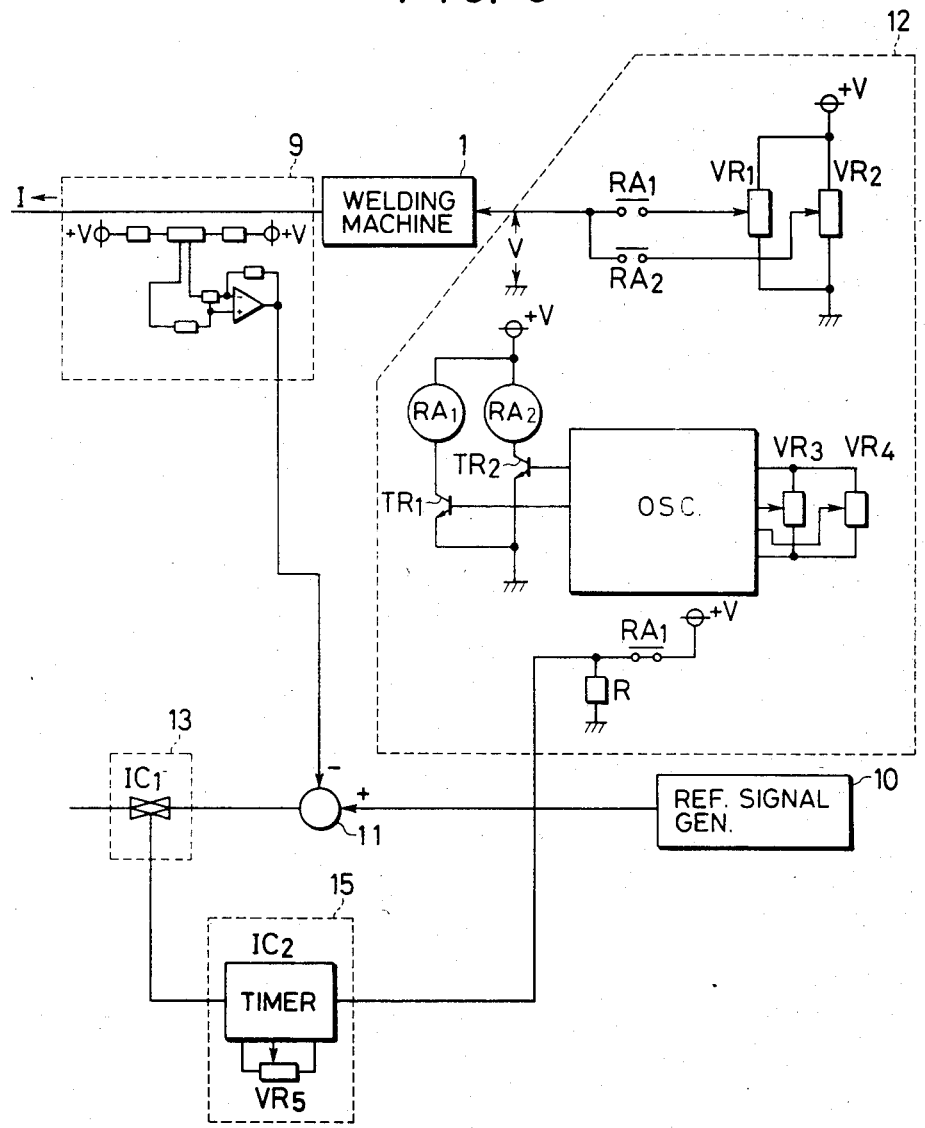
FIG. 5 shows details of feed length control device of FIG. 3.

FIG. 5 is a circuit diagram illustrating the circuits 9, 12, 13 and 15 in detail.

In FIG. 5, the curent detector 9 is implemented with Hall elements wherein a welding current I flowing therethrough generates a magnetic field in a direction vertical to the flow direction of the welding current due to Hall effect and a Hall voltage whose amplitude is proportional to the strength of the magnetic field is generated. This voltage signal is outputted as the output of the current detector after amplification. This type current detector is commercially available.

Further, the welding current setting unit 12 includes a base current instruction voltage adjustor (variable resistor) $VR_1$, a peak current instruction voltage adjustor (variable resistor) $VR_2$, a base current time adjustor (variable resistor) $VR_3$ and a peak current time adjustor (variable resistor) $VR_4$. In the welding current setting unit 12, an oscillator OSC is provided to periodically turn ON and OFF transistors $TR_1$ and $TR_2$ alternately in accordance with set times adjusted by the time adjustors $VR_3$ and $VR_4$. In this case, the transistor $TR_1$ is rendered conductive during the base current time, whereas the transistor $TR_2$ is rendered conductive during the peak current time. Relay circuits $RA_1$ and $RA_2$ are selectively actuated in response to the ON/OFF operation of the transistors $TR_1$ and $TR_2$. A first terminal of each of the relay circuits $RA_1$ and $RA_2$ is coupled to the wiper terminals of $VR_1$ and $VR_2$, to vary the base current value and the peak current value. The thus adjusted values are applied to the welding apparatus 1. The first terminal of the relay circuit $RA_1$ is further coupled to a power source $+V$ and a resistor R. The junction point between the relay circuit $RA_1$ and the resistor R is coupled to the delay circuit 15.

The feed length control start instruction circuit 13 is a gate circuit which functions to output the output of the comparator 11 to the motor drive circuit 14 at an appropriate time. An example of the circuit 13 is an analog switch of a type commercially available.

The delay circuit 15 functions to delay the output timing of the base time output of the welding current setting unit 12 for the period of time set by a delay time setting time adjustor (variable resistor) $VR_5$.

The operation of this circuit will be described.

When the base current and peak current instruction voltage, set by $VR_1$ to $VR_4$ in the welding current setting unit 12, are applied to the welding apparatus 1, the welding apparatus 1 operates to allow a welding current I to flow between the wire electrode 3 and the base metal 8. The welding current I is detected by the current detector 9 and compared with a reference signal from the circuit 10. This comparison result is amplified and then outputted as a difference signal.

Figure 1:
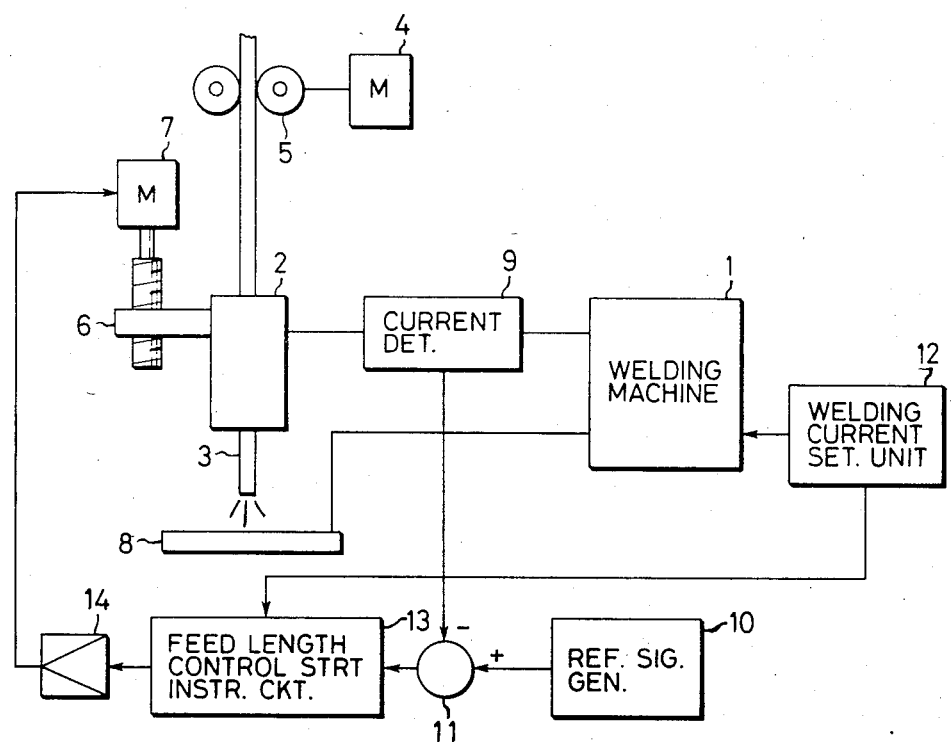
FIG. 1 is a block diagram showing a conventional feed length control device used in a consumable electrode welding operation.
Figure 2:
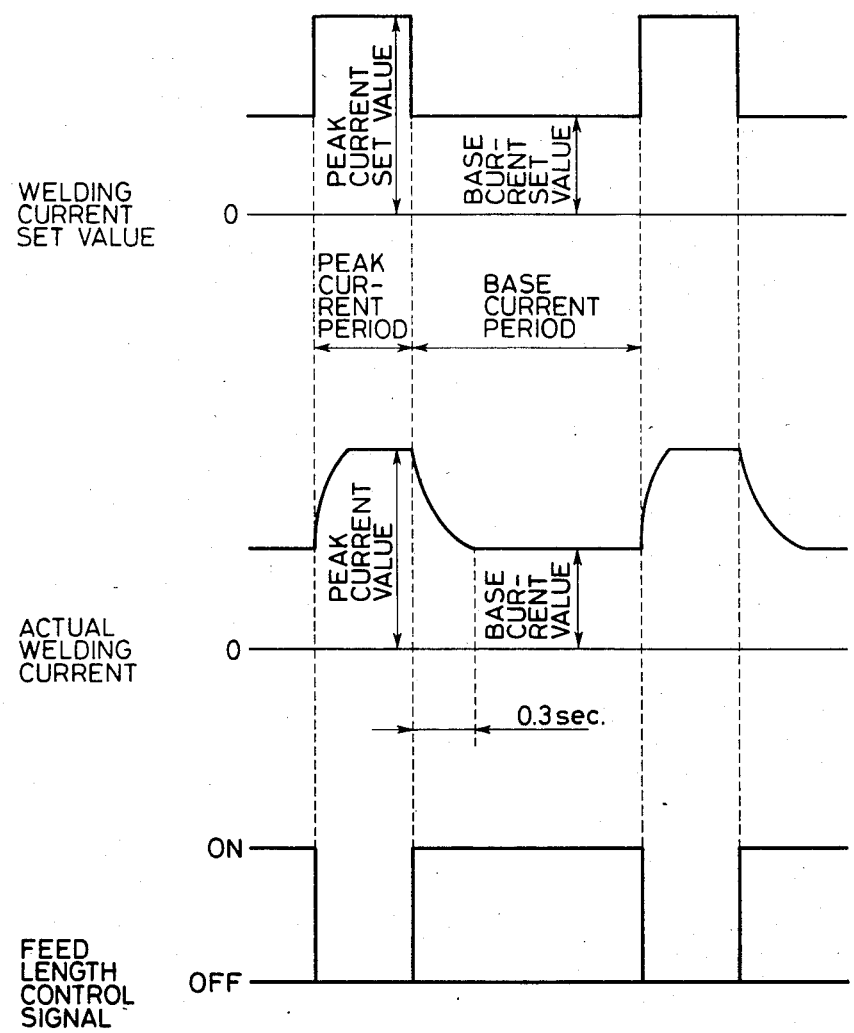
FIG. 2 is a timing chart used for a description of the operation of the conventional feed length control device.

In the conventional apparatus shown in FIG. 1, the output of the circuit 12 is directly connected to the circuit 13 to control the movement of the torch in both upward and downward directions during the base current period of the welding current. In this case, however, as discussed above, this apparatus is disadvantageous in that an undesired delay may occur between the output voltage signal of the circuit 12 and the actual welding current waveform signal, which is caused by the inertial force of the wire feeding motor. This undesired delay makes it impossible to carry out a suitable control operation.

According to the present invention, the delay circuit 15 is provided to eliminate the difference of 0.3 sec. shown in FIG. 4.

Figure 6:
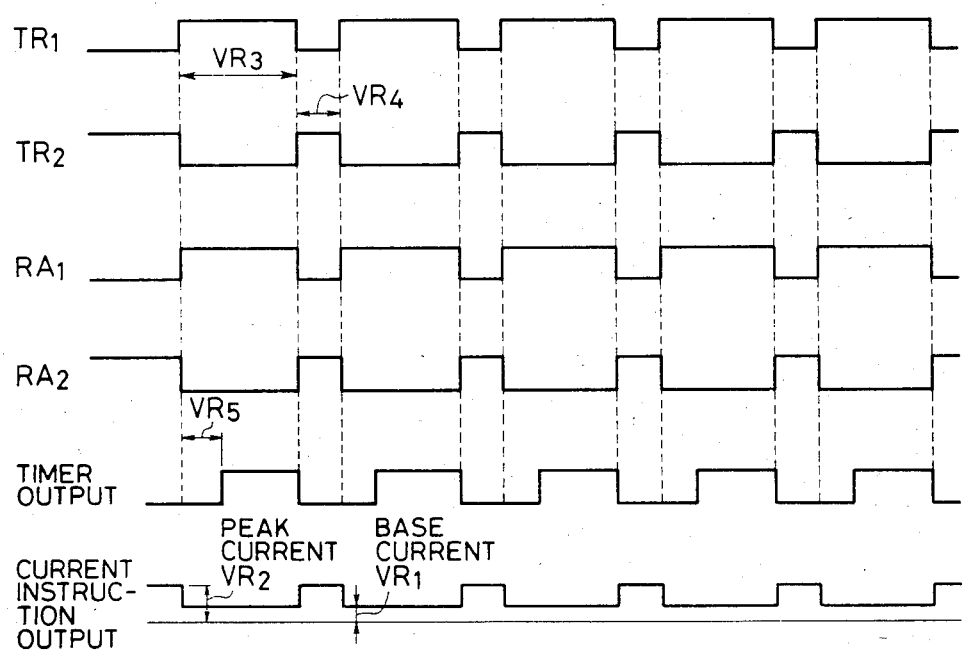
FIG. 6 is a timing diagram used for an explanation of FIG. 5.

The timing chart of FIG. 6 shows the ON/OFF operations of the transistors and relay circuits, the output of the timer 15, and the current instruction output signal.

As is apparent from the above description, in the feed length control device of the invention, the start of feed length control is delayed for a predetermined period of time from the time instant when the welding current set value changes from the peak current set value to the base current set value; that is, feed length control is started only after the actual welding current reaches the base current value. Therefore, the feed length will never be excessively long, and therefore the resultant weld will be satisfactory, having a deep weld penetration.

We claim:

1. In a feed length control device for use in a consumable electrode welding system including means (1) for genrating a welding current in the form of a pulse signal having peak current periods alternating with base current periods, means (9) coupled to an output of the generating means for detecting the welding current, means (10) for supplying a reference signal, means (11) for comparing an output of the detecting means with the reference signal, bi-directional drive means (6, 7) for moving a welding torch (2) vertically relative to a workpiece (8), and feed length control means (13) responsive to an output of the comparing means for energizing the drive means during base current periods of the welding current to maintain a constant separation between the workpiece and an electrode and thus a constant average welding current as the electrode is consumed, the improvement comprising: means (15) for delaying an output from said feed length control means for a predetermined period of time from the start of each base current period.

2. The feed length control device of claim 1, wherein said delaying means comprises an electronic timer and a variable resistor coupled to said timer for varying a delay time thereof.

3. The feed length control device of claim 1, further comprising a welding current setting unit (12) for establishing the magnitudes and durations of the peak current periods and base current periods, one output of said setting unit being coupled to said generating means and another output thereof being coupled through said delaying means to said feed length control means.

4. The feed length control device of claim 3, wherein said feed length control means comprises a gate circuit, and said another output of the setting unit is an enabling signal for said gate circuit.

* * * * *